Nov. 1, 1938.  A. T. SCHEIWER  2,135,223
COUPLING
Filed March 22, 1937  2 Sheets-Sheet 1
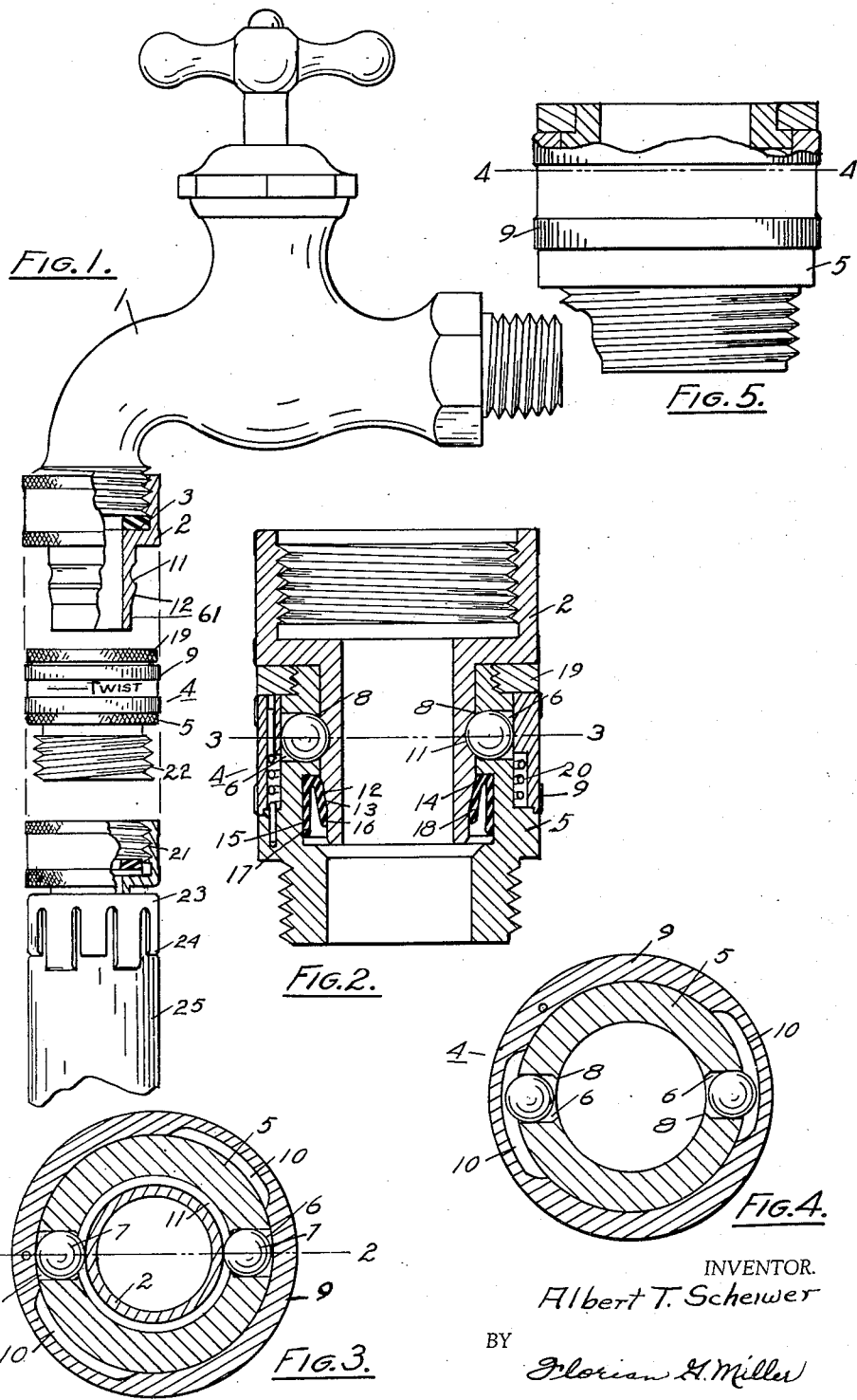
INVENTOR.
Albert T. Scheiwer
BY
Florian L. Miller
ATTORNEY.

Nov. 1, 1938.   A. T. SCHEIWER   2,135,223
COUPLING
Filed March 22, 1937   2 Sheets-Sheet 2
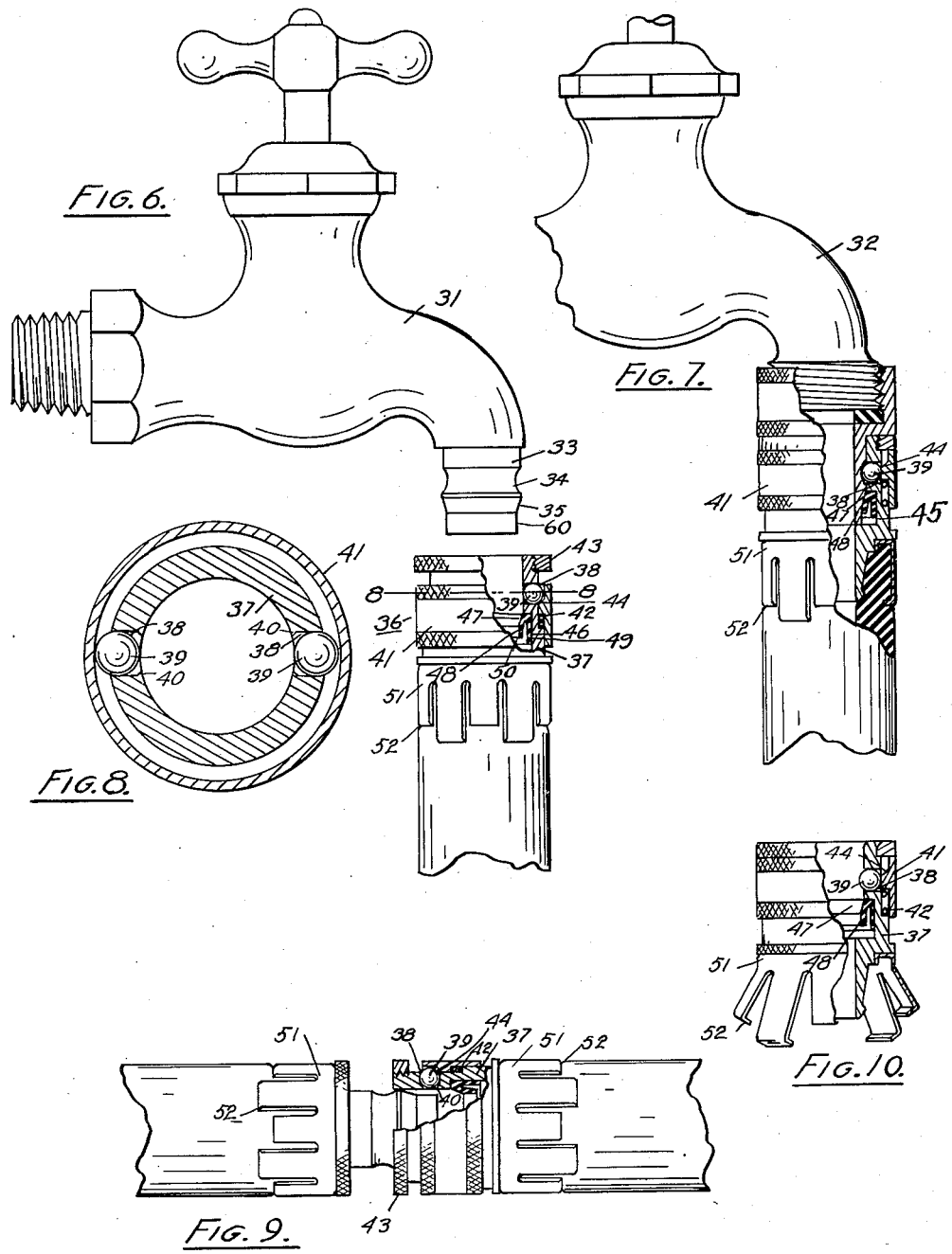
INVENTOR.
Albert T. Scheiwer
BY
Florian H. Miller
ATTORNEY.

Patented Nov. 1, 1938

2,135,223

UNITED STATES PATENT OFFICE 2,135,223

COUPLING

Albert T. Scheiwer, Erie, Pa.

Application March 22, 1937, Serial No. 132,187

8 Claims. (Cl. 285—96)

This invention relates to quickly detachable couplings and more particularly to improvements in operation and construction of quickly detachable couplings.

All couplings of this character made according to the prior art, and with which I am familiar, have not been efficient in sealing the water or other fluids where both sealing efficiency and quick attachability were required. Furthermore, the coupling had to be made in several parts requiring considerable material and machine operations. The length and diameter of the coupling was also considerable because of the several parts necessary in their construction. The assembly of the unit required considerable time and the coupling became disassembled many times when the hose to which it was attached was rolled around the lawn. Quickly detachable couplings have heretofore not been used for attaching garden hose because of the cost of manufacture of these prior quickly detachable couplings.

It is, accordingly, an object of my invention to overcome the above defects in the present type of coupling of the quickly detachable type now on the market and more particularly to provide a coupling which is simple in construction, easy to operate, efficient in operation, easy to assemble and disassemble, economical in manufacture, and cheap in cost.

Another object of my invention is to provide a quickly detachable coupling which will not separate except upon manual intervention.

Another object of my invention is to provide a seal for a quickly detachable coupling which permits quick attachment with a high degree of sealing efficiency.

Another object of my invention is to provide a coupling which requires about one-half of the material and is much less in diameter and length for the same size of passage in the present type of coupling now on the market.

Another object of my invention is to provide a coupling with a minimum number of parts.

Another object of my invention is to provide a quickly detachable coupling having clamping means integral therewith for hose connections.

Other objects of my invention will become evident from the following detailed description, taken in conjunction with the accompanying drawings, in which—

Fig. 1 is a side elevational view partly in section of my novel quickly detachable coupling connected to a faucet.

Fig. 2 is an enlarged sectional view taken through the center of the coupling shown in Fig. 1.

Fig. 3 is a view taken on the line 3—3 of Fig. 2 with the balls and sleeve in a locking position.

Fig. 4 is a view taken on the line 3—3 of Fig. 2 with the balls and sleeve in an unlocked position.

Fig. 5 is a side elevational view partly in section showing the annular shoulder holding the sleeve in position secured to the shell by a peening or rolling operation instead of by threaded means.

Fig. 6 is a side elevational view partly in section showing a modified form of my novel quickly detachable coupling connected to a faucet with a male member integral therewith.

Fig. 7 is a side elevational view partly in section showing my novel modified form of invention connected to a conventional type faucet.

Fig. 8 is an enlarged view taken on the line 8—8 of Fig. 6.

Fig. 9 is a side elevational view partly in section of my novel coupling connecting two sections of hose together.

Fig. 10 is a side elevational view partly in section of the female member of my novel coupling member wherein hose clamps are attached integrally therewith.

Referring to the drawings, Fig. 1 shows a conventional type faucet 1 having connected therewith a male member 2 of a coupling with the usual washer interposed therebetween. The female member 4 engages the male member 2 and comprises a short, compact cylindrical shell 5 having radially extending apertures 6 for the disposal of locking balls 7, the bottom portions 8 of the apertures 6 being slightly restricted to prevent the balls 7 from falling therethrough. A sleeve 9 held against rotation by a spring 20 surrounds the shell 5 and it is provided with grooved portions 10 to permit outward movement of the balls 7, the sleeve 9 normally locking the balls 7 in the grooved portion 11 of the male member 2 to lock the male and female members 2 and 4 together.

The male member 2 is provided with a tapered portion 12 for engagement with the tapered portion 13 of a novel U-shaped washer 14 which is disposed in a grooved portion 15 in the shell 5. A small portion 16 of the internal periphery of the washer 14 is parallel with the outer wall 17 of the washer 14 so that when the liquid is forced between the outer and inner walls 17 and 18, the inner wall 18 will be forced against the tapered portion 12 of the male member 2 and the straight portion 16 will be forced against its contacting surface 61 on the male member 2, the result being a wedging action which provides a perfect seal. This form of washer 14 makes connection and disconnection of the male and female members 2 and 4 a very easy operation with a minimum of wear on the washer and with a perfect sealing efficiency. The use of a tapered portion 12 on the male member 2 and the tapered portion 13 on the U-shaped washer permits the use of a coupling with a minimum external diameter in proportion to the size of the internal passage. The small untapered portion 16 on the internal periphery of the washer 14 is the secret of the sealing efficiency of this combination.

An annular member 19 is threaded onto the end of the shell 5 to provide an abutting shoulder for the sleeve 9 and to permit easy assembly and disassembly of the female member 4. The annular member 19 permits the female member 4 to be of a minimum length and diameter and with a one piece shell 5. It is evident that this annular member 19 may be of a form shown in Fig. 5 wherein peening or rolling secures the member 19 to the shell 5 rather than threaded means. This annular member 19 permitting a coupling of minimum size saves in material and manufacturing costs.

A connection 21 may be threadably engaged to the threaded portion 22 of the shell 5 with a hose clamp 23 integral therewith the hose clamp 23 having claws 24 of varying lengths for gripping the external portion of a hose 25.

In making a connection between the male and female members 2 and 4, the sleeve 9 is rotated against the force of the spring 20 until the slots or grooved portions 10 are directly over the apertures 6 holding the balls 7 thereby permitting the balls 7 to move outwardly upon insertion of the male member 2 into the female member 4. When the groove 11 on the male member 2 is in line with the apertures 6, the sleeve 9 is released and the balls 7 are forced into engagement with the groove 11 on the male member 2 to secure the male and female members 2 and 4 together. The tapered portion 12 on the connecting portion of the male member 2 engages the tapered portion 13 of the washer 14 and the straight portion of the male member 2 forward of the tapered portion 13 engages the small straight portion 16 on the washer 14 to provide a perfect seal between the male and female members 2 and 4.

Figs. 6 and 7 show faucets 31 and 32 to which are connected a slightly modified form of coupling from that shown in Fig. 1. The faucet 31 in Fig. 6 has a male connecting member 33 integral therewith and with a circumferential groove 34 and a tapered portion 35. The female member 36 comprises a compact cylindrical shell 37 having radial apertures 38 for receiving balls 39 which engage the groove 34 on the male member 33 to secure the male and female members 33 and 36 together. The apertures 38 are restricted slightly at the inner edges 40 to prevent the balls 37 to fall therethrough. A telescopically disposed sleeve 41 surrounds the shell 37 and holds the balls 39 in the groove 34 when the male and female members are connected together. A spring member 42 constantly urges the sleeve 41 into locking engagement with the balls 39 and against an annular shoulder 43 which is threadably engaged to the shell 37. The sleeve 41 is tapered at 44 to urge the balls 39 into the groove 34 of the male member 33 gradually upon its longitudinal movement under the force of the spring member 42.

The shell 37 has an internal groove 45 which receives a U-shaped washer 46 having a tapered portion 47 interiorly thereof for engaging the tapered portion 35 on the male member 33. A small portion 48 of the interior of the washer 46 is parallel with the outer wall 49 thereof in order to provide a better seal when the liquid is forced between the outer and inner walls 49 and 50 of the washer 46. The tapered portion 35 of the male member 33 recedes into a straight portion 60 to conform to the contour of the interior of the washer 46 to provide a perfect seal as well as a coupling with a minimum amount of obstruction when the male and female members thereof are connected together.

Hose clamps 51 having clamps 52 of varying lengths are formed integral with the female member 36 as shown particularly in Fig. 10. The claws 52 are easily forced into the hose connections as shown in Figs. 6, 7, and 9. The alternate length of the claws 52 prevents the tearing of the hose and the breaking thereof at one point on the circumference. Hose clamps 51 are shown in Fig. 9 connected to both the male and female members 33 and 36.

It will be evident from the foregoing description that I have provided a quickly attachable and detachable coupling whose external proportions are at a minimum, whose construction is simple and cheap in cost, and whose operation is efficient in respect to sealing efficiency and minimum obstruction and wear of parts.

It will be readily apparent that the leak-proof swivel feature of this invention prevents kinking and breaking of the hose. The tapered portion of the U-shaped washer and its engaging portion on the male member with their corresponding straight connecting portions makes the relative rotation of the male and female members very easy and this feature makes this type of hose connection very valuable especially when combined with the other features of this invention.

Various changes may be made in the specific embodiment of the present invention without departing from the spirit thereof, or within the scope of the appended claims.

What I claim is:

1. A coupling comprising a grooved male member having a tapered portion, and a female member comprising a shell, ball members disposed therein for engaging the groove in said male member to secure said male and female members together, a sleeve surrounding said shell for normally holding said ball members in engagement with the said groove of said male member but permitting their release upon movement thereof, an annular member disposed on said shell for maintaining said sleeve in position on said shell, and an annular washer, U-shaped in cross-section, the internal wall of which is tapered and engageable with said tapered portion on said male member.

2. A coupling as claimed in claim 1 wherein the tapered portion of said male member recedes into a straight portion and the tapered portion of said U-shaped washer recedes likewise into a straight portion to provide a wedging action when liquid enters between the walls of the U-shaped washer.

3. A coupling comprising a male member having a grooved connecting portion on one end thereof and means for clamping a hose on the other end thereof, and a female member comprising a cylindrical shell, ball members disposed in said shell to engage the groove in the connecting portion of said male member to connect said male and female members together, a sleeve for normally holding said ball members in engagement with said grooved portion on said male member but permitting release thereof upon movement of said sleeve, a washer for engagement with the connecting portion of said male member to provide a seal between said members, an annular member disposed on the end of said female member to hold said sleeve in place and clamping members on the other end of said female member for clamping a hose thereto, said clamping means having clamps of varying lengths.

4. A coupling comprising a grooved male member having a tapered portion and a straight end portion, and a female member comprising a shell, ball members disposed in said shell to engage the grooved portion of said male member to connect said male and female members together, an annular washer, U-shaped in cross-section, a portion of the internal wall of which is tapered and engageable with the tapered portion of said male member, the portion of said washer not tapered engaging the straight portion of said male member to provide a seal between said male and female members, and an annular member disposed on said shell for holding said sleeve in position on said shell.

5. In a coupling, in combination, a grooved male member having a tapered portion and a straight end portion, and a female member for engagement with said male member comprising a cylindrical shell, balls disposed in said shell to engage the grooved portion of said male member to connect said male and female members together, an annular washer, U-shaped in cross-section, a portion of the internal wall of which is tapered and engageable with the tapered portion on said male member and the remaining straight portion of the interior surface thereof disposed to engage the straight end portion of said male member to provide a wedging action when a liquid is forced between the walls of said U-shaped washer, and an annular member disposed on said shell for maintaining said sleeve in position on said shell.

6. A coupling as in claim 5 wherein clamping means are disposed on said shell of said female member to connect a hose thereto, said clamping means having clamps of varying lengths.

7. A coupling as in claim 5 wherein clamping means are disposed on said shell of said female member and also on said male member to clamp hose thereto, said clamping means having clamps of varying lengths.

8. A coupling comprising a grooved male member having a tapered portion, and a female member comprising a shell, members disposed therein for engaging the grooves in said male member to secure said male and female members together, a sleeve surrounding said shell for normally holding said members in engagement with said groove of said male member but permitting their release upon movement thereof, and an annular washer, U-shaped in cross-section, the internal wall of which is tapered and engageable with the tapered portion of said male member.

ALBERT T. SCHEIWER.